United States Patent
Guigon et al.

(10) Patent No.: US 8,342,913 B2
(45) Date of Patent: Jan. 1, 2013

(54) ORBITAL APPARATUS FOR MACHINING A REVOLUTION METALLIC WALL

(75) Inventors: Jean-Paul Guigon, Givry (FR); Didier Boivin, Chalon sur Saone (FR); Rolf Schuster, Brutten (CH)

(73) Assignee: Areva NP, Courbevoie (FR)

( * ) Notice: Subject to any disclaimer, the term of this patent is extended or adjusted under 35 U.S.C. 154(b) by 446 days.

(21) Appl. No.: 12/514,107

(22) PCT Filed: Nov. 8, 2007

(86) PCT No.: PCT/FR2007/001846
§ 371 (c)(1), (2), (4) Date: Aug. 13, 2010

(87) PCT Pub. No.: WO2008/068407
PCT Pub. Date: Jun. 12, 2008

(65) Prior Publication Data
US 2010/0297921 A1 Nov. 25, 2010

(30) Foreign Application Priority Data
Nov. 9, 2006 (FR) ...................................... 06 09791

(51) Int. Cl.
*B24B 21/02* (2006.01)
(52) U.S. Cl. ........................................ 451/303; 451/296
(58) Field of Classification Search .................. 451/303, 451/296, 438, 439, 441, 453
See application file for complete search history.

(56) References Cited

U.S. PATENT DOCUMENTS

| 2,455,742 | A | * | 12/1948 | Dorian | 451/441 |
| 3,009,048 | A | | 11/1961 | Carl | |
| 3,194,936 | A | | 7/1965 | Rohrberg et al. | |
| 3,641,608 | A | * | 2/1972 | Kratt | 15/88 |
| 3,816,861 | A | * | 6/1974 | Jungle et al. | 451/439 |
| 4,297,061 | A | * | 10/1981 | Wolfe et al. | 409/131 |
| 5,772,496 | A | * | 6/1998 | Kurtz et al. | 451/296 |
| 7,059,945 | B2 | * | 6/2006 | Skinner | 451/91 |

FOREIGN PATENT DOCUMENTS

| DE | 1300833 B | 8/1969 |
| GB | 1039570 A | 8/1966 |
| GB | 1113412 A | 5/1968 |

* cited by examiner

*Primary Examiner* — Robert Rose
(74) *Attorney, Agent, or Firm* — Connolly Bove Lodge & Hutz LLP (57) ABSTRACT

The invention relates to an orbital apparatus (20) for machining of a revolution metallic wall, of the type comprising a fixed annular plate (30) coaxially mounted on a universal support and having a peripheral annular electric collector (35) and an annular plate (50) rotationally mobile and coaxially mounted on the fixed annular plate (30). The mobile annular plate (50) carries a set of electrical contacts (55) cooperating with the electrical collector (35), means (60) for rotationally driving the plate (50), means (70) for machining the metallic wall and pneumatic feeder means (80) to apply and maintain the machining means (70) on the metallic wall.

13 Claims, 8 Drawing Sheets

ORBITAL APPARATUS FOR MACHINING A REVOLUTION METALLIC WALL

CROSS REFERENCE TO RELATED APPLICATIONS

This application is a National Phase filing under 35 U.S.C. §371 of PCT/FR2007/001846 filed Nov. 8, 2007, which claims priority to Patent Application No. 0609791, filed in France on Nov. 9, 2006. The entire contents of each of the above-applications are incorporated herein by reference.

The present invention relates to an orbital machine for grinding a metal wall of revolution.

In many industrial applications, such as nuclear, petrochemicals, offshore, gas pipelines, oil pipelines, high-pressure or submarine pipelines, it is necessary, after having welded two metal parts together and more particularly when it involves thick-walled parts welded with a narrow bevel, to carry out a grinding of the surface of the weld and more particularly a milling of this surface in order to obtain a geometry compatible with ultrasound inspection means in order to examine the weld.

Specifically, during an inspection by ultrasound or by gammagraphy, the sensor must be kept in contact with the surface of the weld during its movement in order to carry out a correct inspection, particularly when it involves inspecting a weld that is narrow and very deep with a weld surface that may be inclined relative to the axis of the part to be inspected.

Such ultrasound inspections are carried out for example after the replacement of a worn steam generator of a pressurized water nuclear reactor.

Specifically, pressurized water nuclear reactors comprise, inside a reactor building, a tank enclosing the reactor core filled with pressurized water and a primary coolant circuit consisting of several loops in communication with the tank. Each of the loops of the primary coolant circuit comprises a steam generator in which the pressurized water cools while heating and vaporizing the feedwater.

The steam generators of each of the loops are connected to the tank by pressurized water inlet and outlet pipes called primary coolant pipes. These pipes are connected to the water box of the steam generator situated in its lower portion, by means of elbows and nozzles made when the steam generator water box is formed. The connection elbows are welded via a first of their ends to the end of the primary coolant pipe and via their second end to the nozzle for connection of the steam generator water box.

After a certain time of operation, the steam generators that enclose a bundle of heat-exchange tubes ensuring the separation between the primary coolant water and the feedwater, must be inspected and, if certain tubes of the bundle have leaks, these tubes must be closed off by a plug or sleeved in order to prevent the contamination of the feedwater.

When the steam generator has operated for a long period, it may therefore be necessary to replace all or some of the tubes of the bundle.

Such a replacement operation is so complex that it has seemed preferable, in certain cases, to carry out the total replacement of the steam generators of the pressurized water nuclear reactors. This replacement operation requires a cutting of the primary coolant pipes near the nozzles for connection of the worn steam generator and a welding of the nozzles of the new replacement steam generator to the primary coolant pipes left unconnected.

The butt-welding of the nozzles of the steam generators to the end portions of the primary coolant pipes left unconnected and carried out by filling a ring-shaped bevel made between the end of the nozzle and the end of the pipe to be connected, by a solder that is compatible with the metal of the nozzle and with the metal of the primary coolant pipe.

The filling of the bevel with the solder is usually carried out by a welding method that is orbital.

After the welding, a grinding and more particularly a milling of the surface of the weld is carried out before carrying out an ultrasound inspection of this weld.

This milling is usually carried out manually which involves the presence of operators for a long period that is all the more stressful for the latter because they are exposed to strong irradiation due to the proximity of the primary coolant circuit in the case of the replacement of a steam generator.

In order to reduce the presence of operators, automatic milling machines are known whose main disadvantage lies in the fact that the current orbital toolage can carry out only one rotation because of the presence of the electric supply cables. The operation is therefore lengthy because of the number of stoppages and reversals of the toolage and the risks of creating hollows on the surface of the weld are considerable at each shutdown and each startup of the milling tool making the ultrasound inspection operations uncertain.

The object of the invention is to prevent these disadvantages by proposing an orbital grinding machine that makes it possible to carry out a grinding operation continuously without reversals or changes of rotational direction thereby reducing the total duration of the intervention and therefore the irradiation dose received by the exposed personnel and the risks of damaging the profile of the weld surface.

The subject of the invention is therefore an orbital machine for grinding a metal wall of revolution, adaptable for example to an orbital machine universal support fixed around the metallic wall of revolution, characterized in that it comprises:
- a fixed annular plate mounted coaxially on the support and comprising at its periphery an annular electric collector,
- an annular plate that can be moved in rotation and is mounted coaxially on the fixed annular plate by means of rolling members, the said movable annular plate supporting:
  - a set of electric contacts designed to interact with the electric collector,
  - means for the rotational actuation of this movable plate,
  - means for grinding the metal wall, and
  - pneumatic supply means for pressing and keeping the grinding means on the metal wall.

According to other features of the invention:
- each annular plate is formed of two half-rings connected together by at least one connecting tie,
- the annular electric collector comprises at least four coaxial tracks, at least three tracks each forming one phase and one track for the rotation of the movable plate,
- the coaxial tracks are placed on the outer edge of the fixed annular plate,
- the set of electric contacts is formed by a trolley comprising two pairs of at least four contacts in order to maintain the electric supply without disconnection in the zones of junction of the tracks of the electric collector between the two half-rings of the fixed annular plate,
- the trolley is attached to the outer edge of the movable annular plate,
- the means for rotating the movable plate comprise a crown wheel arranged on the said movable plate meshing with at least one pinion rotated by an electric motor by means of an angle transmission, the said at least one pinion, the electric motor and the angle transmission being supported by the fixed annular plate, the grinding means comprise an abrasive band mounted on three rollers, a drive roller rotated by an electric motor and designed to drive the abrasive band, a roller for tensioning this band and a roller for pressing the said band on the wall, the said pressing roller being able to be moved by a control member towards the inside of the said plates, the power of the electric motor for rotating the drive roller of the abrasive band is slaved to the force of pressure of this abrasive band on the metal wall, the control member comprises at least one pneumatic cylinder connected to pneumatic supply means, the pneumatic supply means comprise at least one reservoir of compressed air or gas, the movable annular plate supports means for receiving radio signals for the remote control of the means for driving the movable plate and the grinding means in rotation, and the grinding means support, near the abrasive band, a device for recovering metal particles.

Other features and advantages of the invention will appear during the following description, given as an example and made with reference to the appended drawings, in which.

Figure 1:
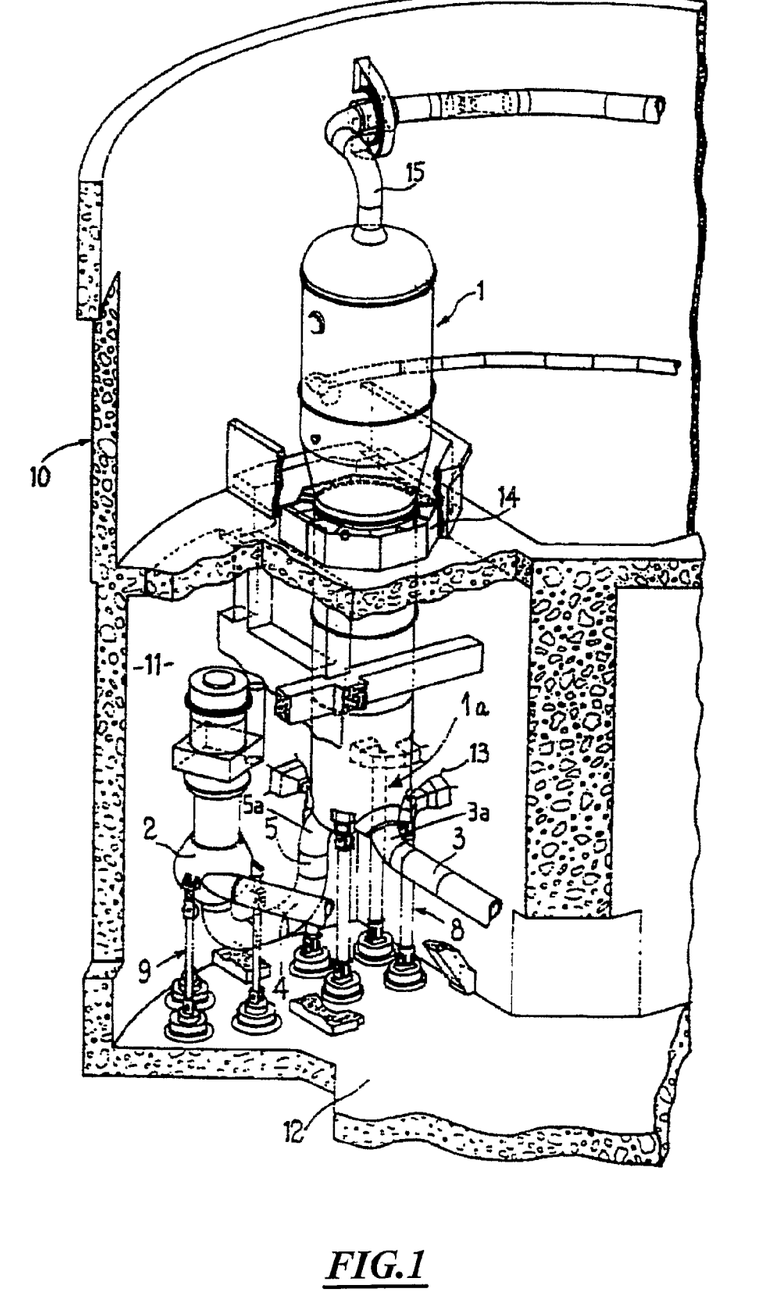
FIG. 1 is an exploded view in perspective of a pressurized water nuclear reactor steam generator in place in a bunker of the reactor building.

FIG. 1 shows schematically a portion of a loop of the primary circuit of a pressurized water nuclear reactor comprising a steam generator 1, a primary coolant pump 2, a primary coolant pipe 3 and 4 making it possible to connect the reactor tank to the steam generator 1 and to the primary coolant pump 2, respectively, and a pipe 5 making it possible to connect the steam generator 1 to the primary coolant pump 2. The steam generator 1 and the primary coolant pump 2 are placed with their axes vertical and rest on sets of articulated supporting legs 8 and 9, respectively.

This figure shows a portion of the reactor building 10 that encloses the tank and the primary coolant assembly of the reactor.

Arranged inside this building 10 is a room 11, or bunker, designed to receive the steam generator 1. This steam generator 1 rests on the floor 12 of the room 11 via articulated supporting legs 8 and this steam generator is centred and positioned at the belts 13 and 14. The containment system of the steam generator is connected at its upper portion to a steam discharge pipe 15.

When an operation to change the steam generator 1 is carried out, the primary coolant pipes such as 3 and 5 are decoupled in the vicinity of their zone of junction with the steam generator nozzles. A new replacement steam generator comprising the connection nozzles is put in place in the room 11, so that these connection nozzles come opposite the unconnected end portions of the primary coolant pipes such as 3 and 5.

Figure 2:
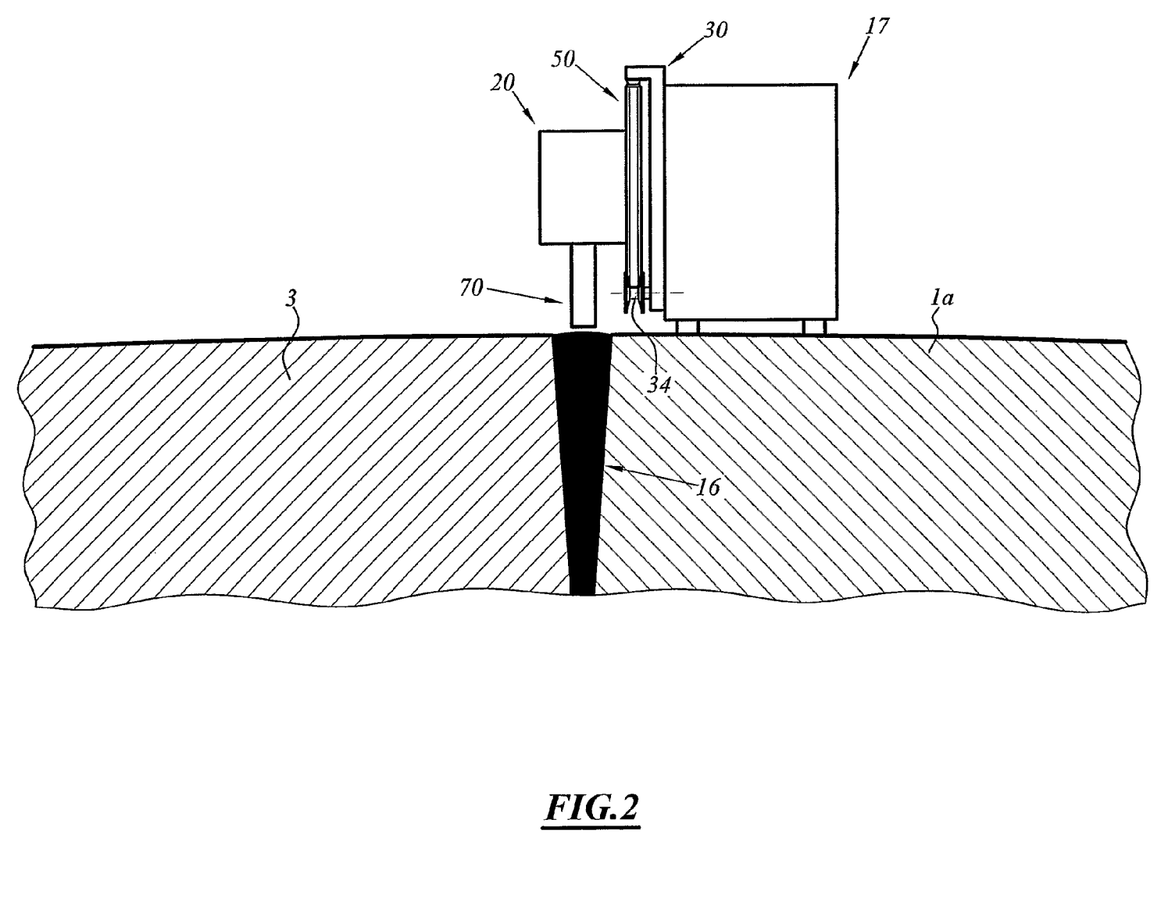
FIG. 2 is a view in elevation and in partial section through an axial plane of the grinding machine according to the invention in the working position for the orbital grinding of a pipe and of a nozzle of the nuclear reactor steam generator.

As shown for example in FIG. 2, the nozzles of the new replacement steam generator and the ends of the primary coolant pipes are ground so that an annular welding bevel 16 of narrow width and great depth is made between each of the corresponding end portions of the nozzles and of the primary coolant pipes.

This FIG. 2 shows, as an example, a nozzle 1a of the new steam generator and an end of a primary coolant pipe 3.

The nozzles and primary coolant pipes are welded together by using an orbital TIG welding device, not shown, whose welding torch is placed in rotation about the axis common to the pipe and to the nozzle in order to sweep the bottom of the annular bevel.

After the welding, a grinding and more particularly a milling of the surface of the weld 16 is carried out before carrying out an ultrasound inspection.

In the following description, the grinding carried out by the orbital machine according to the invention and the milling, other grindings, such as for example polishing, may be carried out by this machine.

As shown in FIG. 2, the orbital grinding machine indicated in its entirety by reference number 20 is mounted on a universal orbital machine support 17 of a known type, attached by appropriate means, not shown, around the metal wall of revolution and, in the present case, to the connection nozzle 1a. The support 17 consists of a ring in several portions that is engaged about the nozzle 1a in a coaxial disposition relative to this nozzle.

Figure 3:
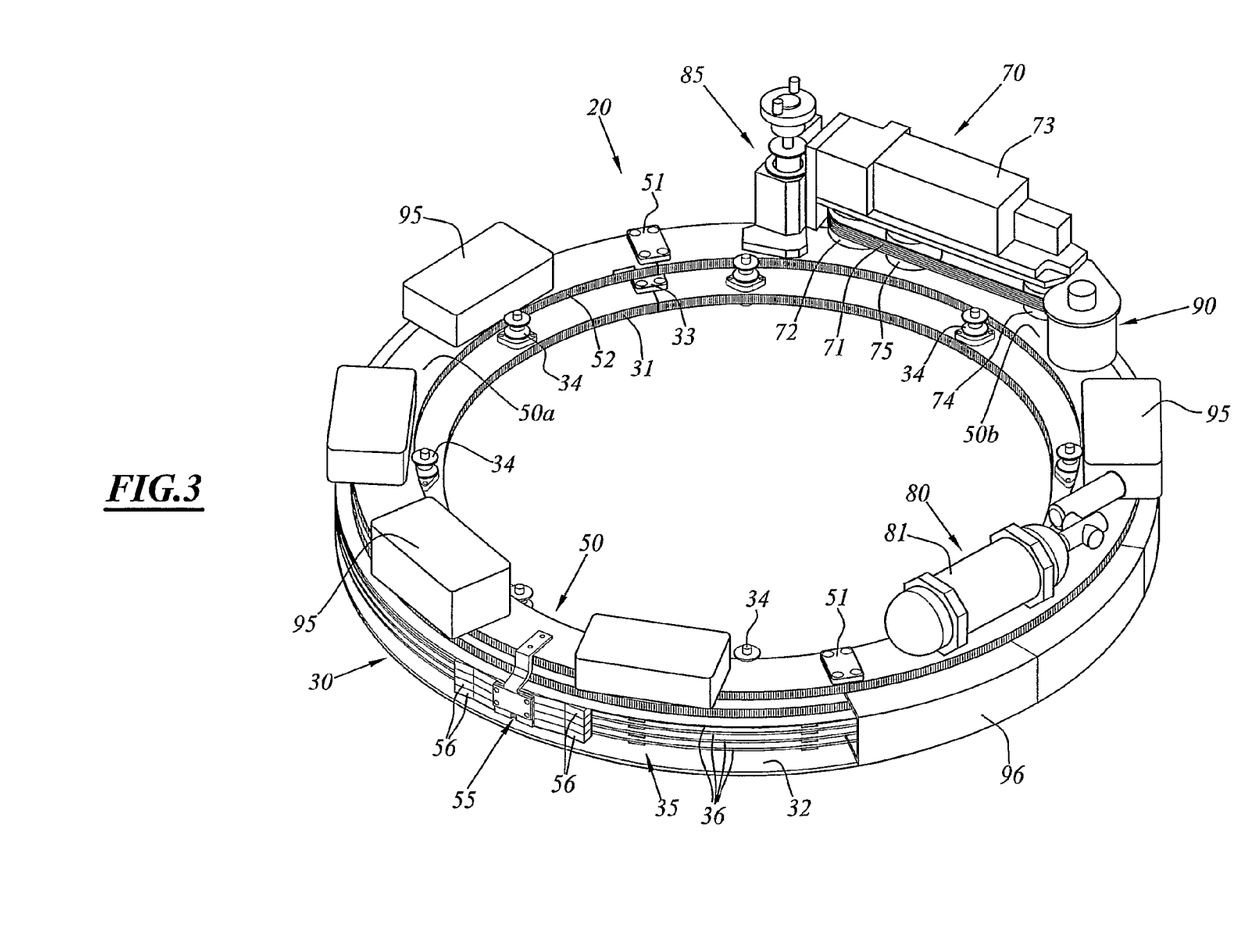
FIG. 3 is a schematic view in perspective of one side of the orbital grinding machine, according to the invention.
Figure 4:
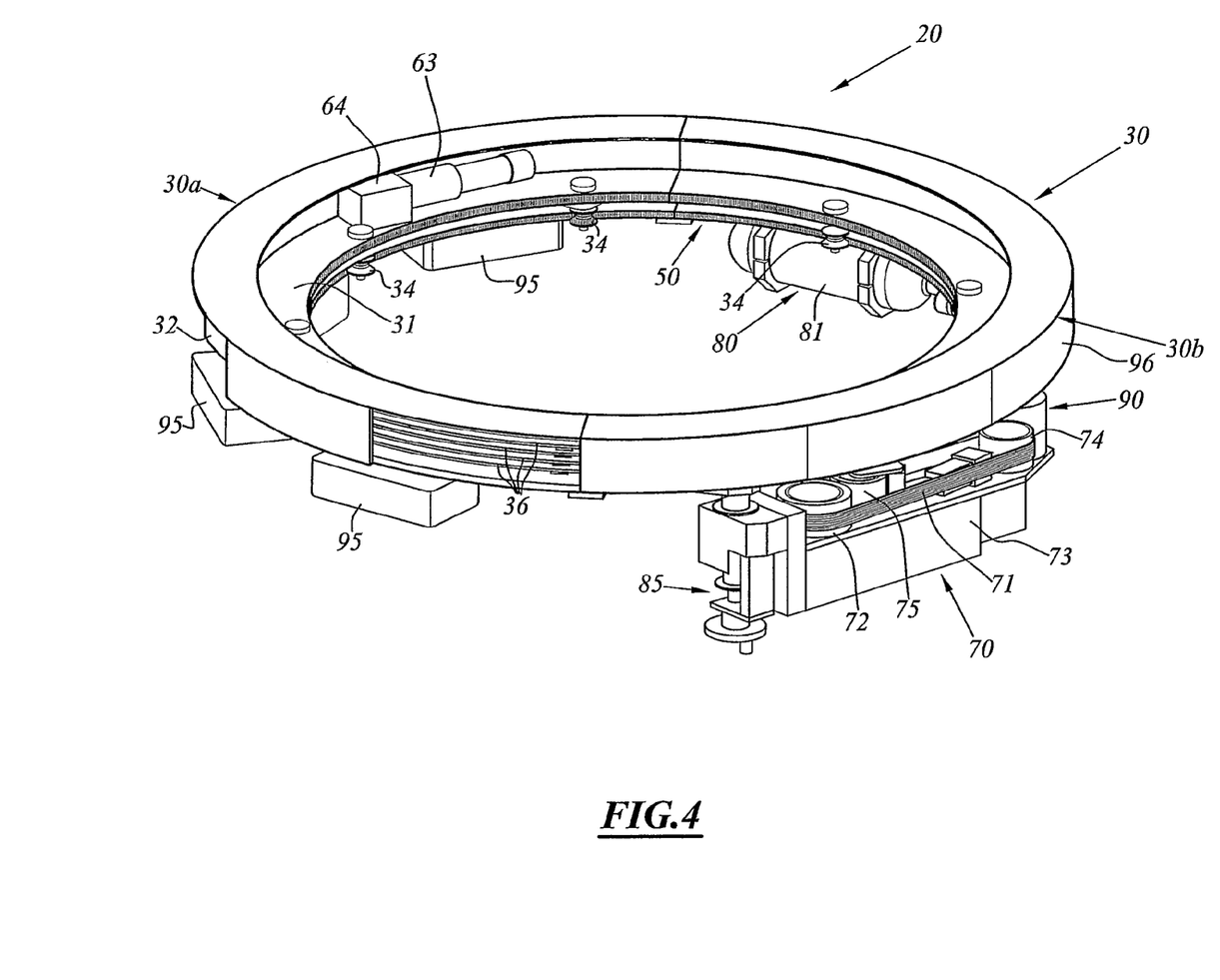
FIG. 4 is a schematic view in perspective of the other side of the orbital grinding machine, according to the invention.

With reference now to FIGS. 3 and 4, the grinding machine 20 will be described.

This grinding machine 20 consists mainly of two portions:
a fixed annular plate 30 mounted coaxially on the support 17, and
an annular plate 50 that is rotatable and mounted coaxially on the fixed annular plate 30.

The fixed annular plate 30 is formed of two half-rings, respectively 30a and 30b (FIG. 5), each having an L-shaped section comprising two branches extending perpendicular to one another, respectively 31 and 32. The half-rings 30a and 30b of the fixed annular plate 30 are connected together at their zones of junction by at least one tie 33 (FIG. 3).

Similarly, the movable annular plate 50 is formed of half-rings, respectively 50a and 50b, that are connected together at their zones of junction by at least one tie 51 (FIG. 3).

The movable annular plate 50 can be rotated relative to the fixed annular plate 30 by means of rolling members consisting of grooved rollers 34 supported by the branch 31 of the said annular plate 30. These grooved rollers 34 are, for example, eight in number uniformly distributed over the periphery of the annular plate 30. The movable annular plate 50 rests on the grooved rollers 34 and its inner edge 52 is bevelled in order to interact with the groove of the rollers 34.

Figure 5:
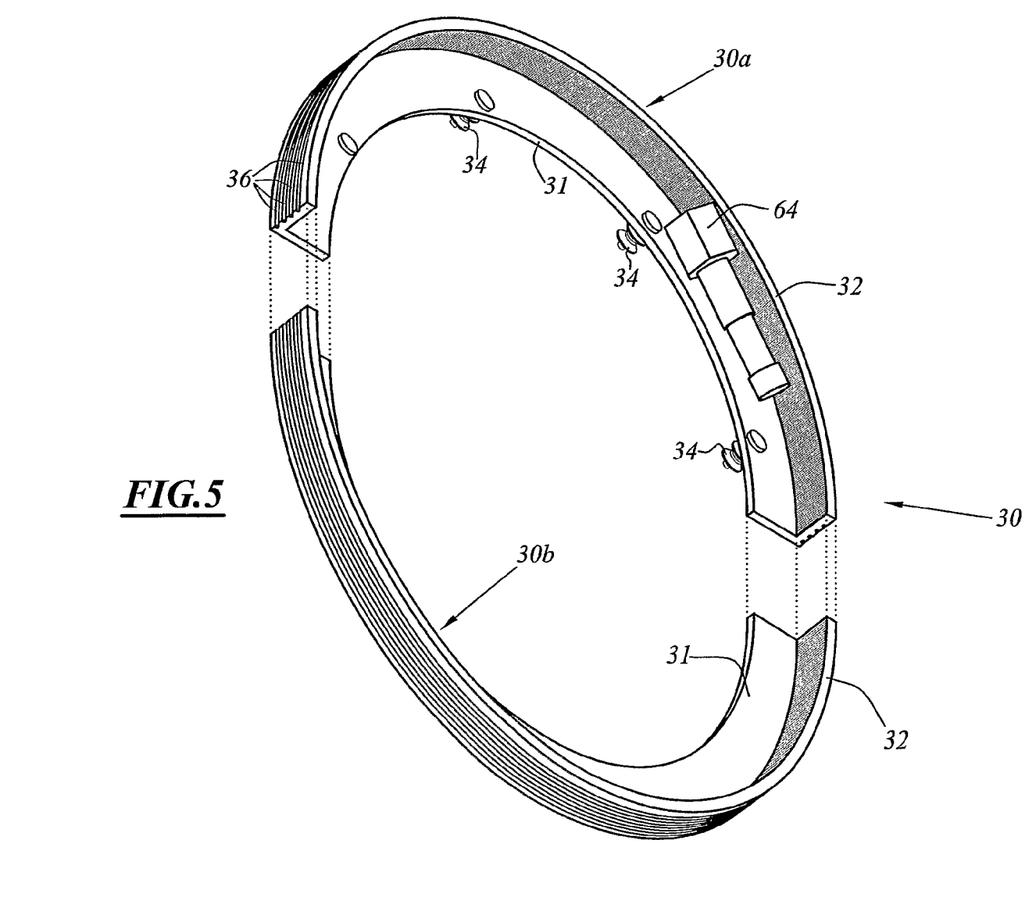
FIG. 5 is a schematic view in perspective of the fixed annular plate of the orbital grinding machine, according to the invention.

As shown in FIGS. 3 to 5, the fixed annular plate 30 comprises, at its periphery, an annular electric collector indicated by the general reference number 35. This electric collector 35 is mounted on the outer wall of the branch 32 of the fixed annular plate 30 and comprises at least four concentric tracks 36, at least three tracks each forming one phase and one track being designed for the rotation of the movable annular plate 50.

To this end, the annular plate 50 comprises a set of electric contacts formed by a trolley 55 designed to interact with the electric collector 35. This trolley 55 is attached to the outer edge of the movable annular plate 50 and comprises two pairs of at least four contacts 56 making it possible to maintain the electric supply in the zones of junction of the tracks 36 of the electric collector 35 between the two half-rings 30a and 30b of the fixed annular plate 30.

Figure 7:
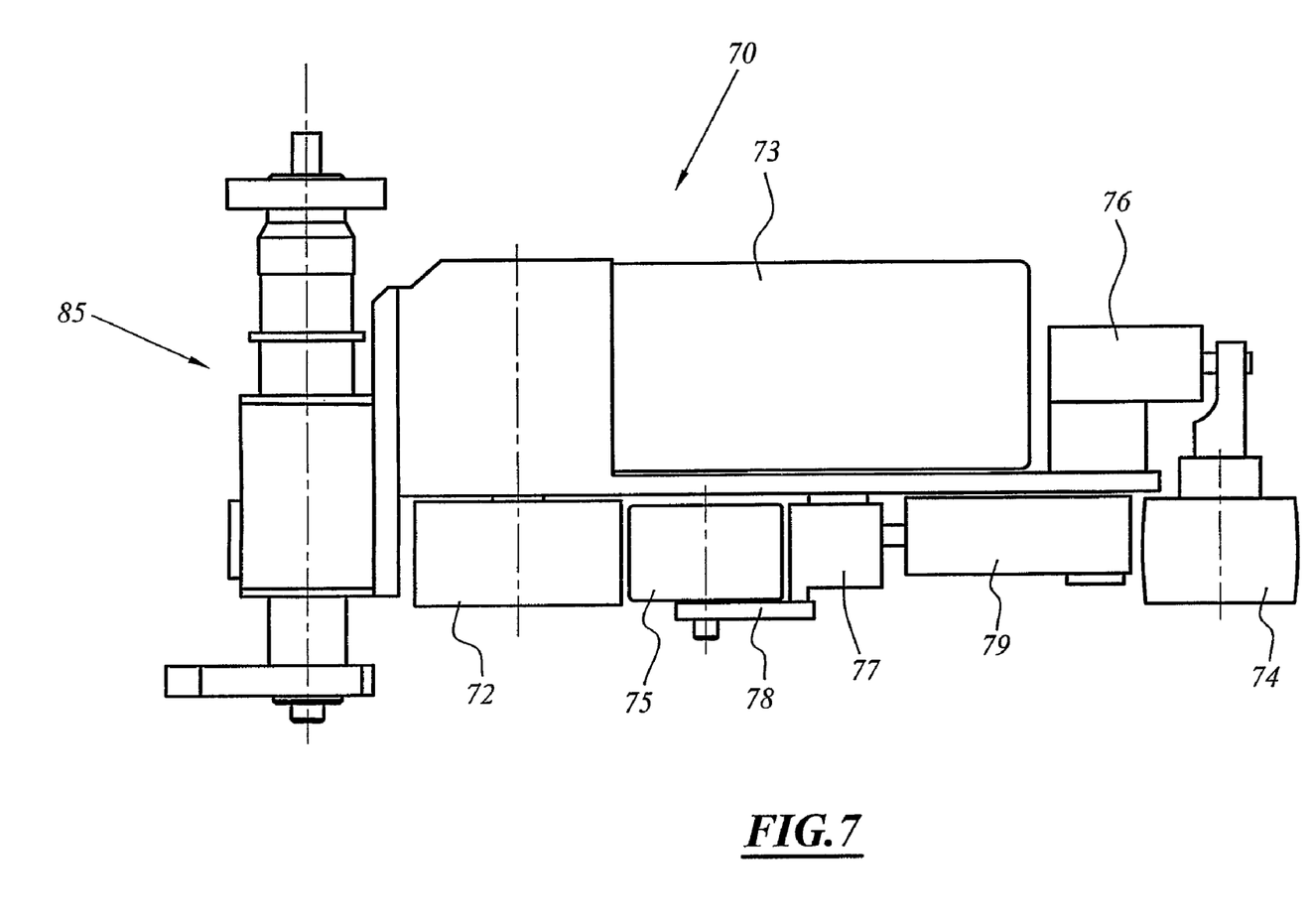
FIG. 7 is a schematic view in elevation of the grinding means of the orbital grinding machine, according to the invention.
Figure 8:
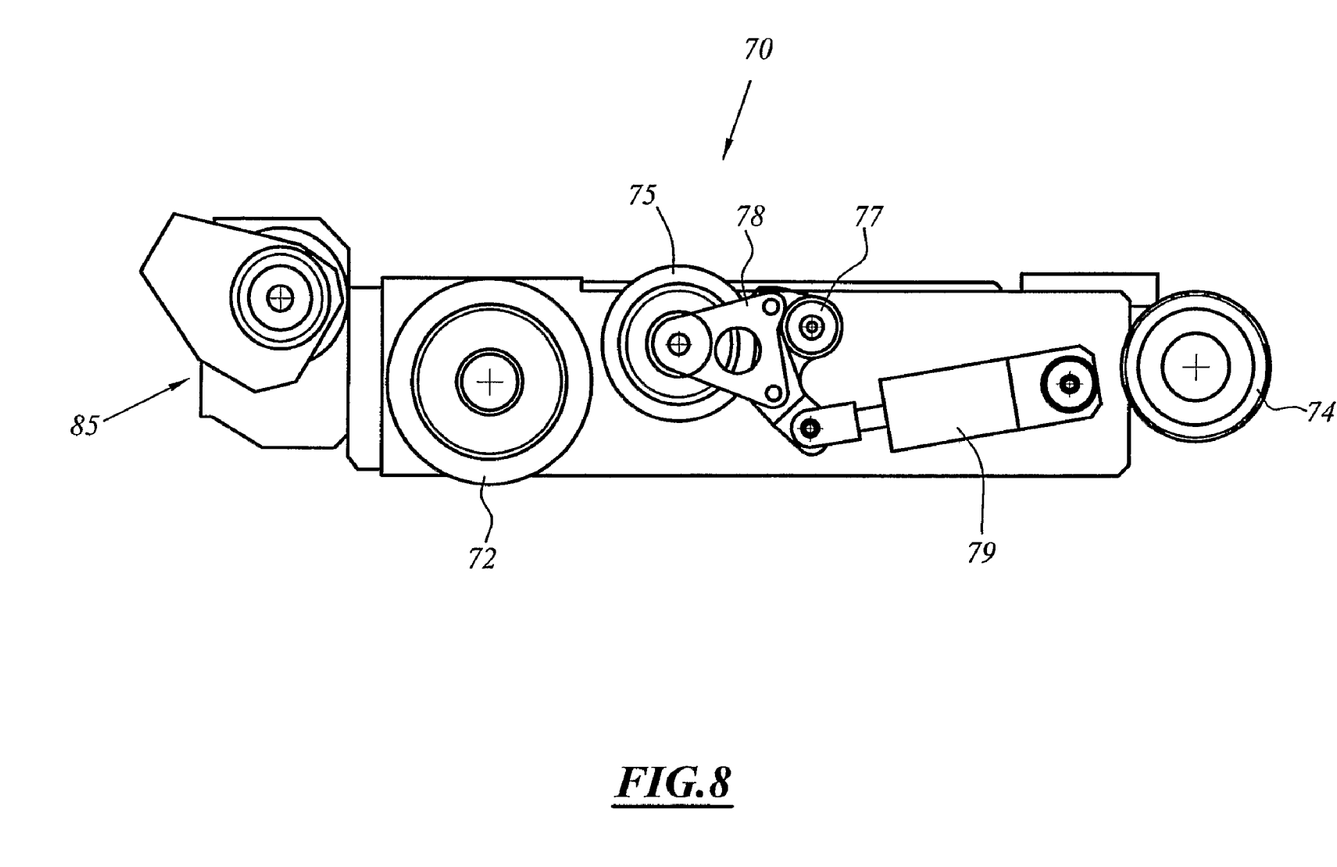
FIG. 8 is a schematic view from below of FIG. 7.

Furthermore, the movable annular plate 50 supports:
means 60 for the rotational actuation of this movable annular plate 50 (FIGS. 4 and 6),
means 70 for grinding the metal wall (FIGS. 3, 7 and 8),
pneumatic supply means 80 (FIG. 3) for pressing and keeping the grinding means 70 on the metal wall.

Figure 6:
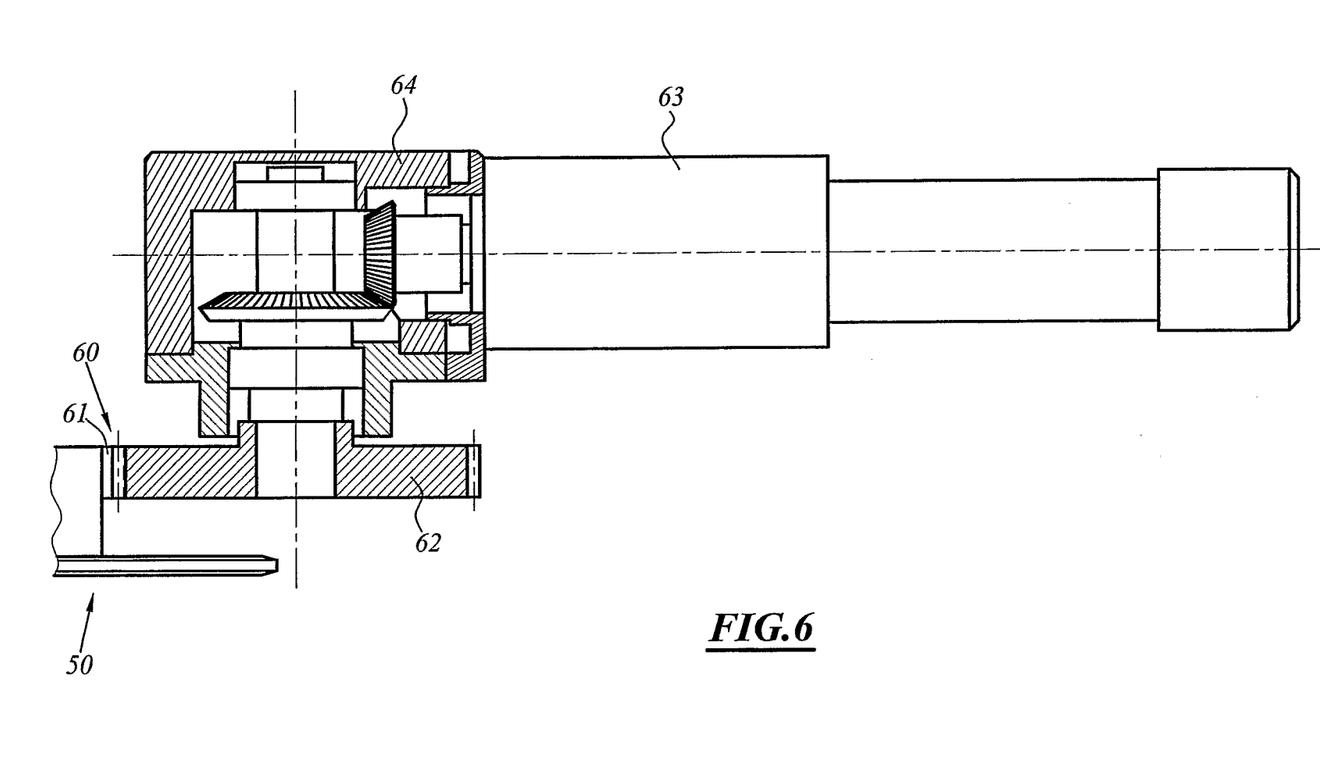
FIG. 6 is a schematic view in elevation and in partial section of the means for rotating the movable annular plate of the orbital grinding machine, according to the invention.

As shown in FIGS. 4 and 6, the means 60 for rotating the movable plate 50 comprise a crown wheel 61 (FIG. 6) that is made on the inner face of the movable plate 50 and that meshes with at least one pinion 62 rotated by an electric motor 63 by means of an angle transmission 64. The assembly consisting of the pinion 62, the electric motor 63 and the angle transmission 64 is supported by the fixed annular plate 30, as shown in FIG. 4 and the drive shaft of the angle transmission 64 passes through the branch 31 of the fixed plate 30 so that the pinion 62 meshes with the crown wheel 61 arranged on the movable plate 50. The motor 63 is supplied electrically by cables, not shown, that are supported by the fixed annular plate 30 and that are connected to the trolley 55.

As shown in FIGS. 3, 4, 7 and 8, the grinding means 70 comprise, in the example shown in these figures, an abrasive band 71 mounted on three rollers, respectively a drive roller 72 rotated by an electric motor 73, a tensioning roller 74 and a roller 75 for pressing the abrasive band 71 on the metal wall to be milled. The tensioning roller 74 is connected to a spring system 76 making it possible to move this roller 74 transversely in order to keep the abrasive band 71 under tension.

The pressing roller 75 is mounted so as to pivot on a shaft 77 by means of a connecting rod 78 (FIG. 8) that is itself connected to a control member 79 in order to move the said pressing roller 75 towards the inside of the plates 30 and 50, that is to say towards the metal wall to be ground.

The control member comprises at least one pneumatic cylinder 79 connected to the pneumatic supply means 80 by at least one connecting pipe, not shown.

The pneumatic supply means 80 preferably comprise at least one tank 81 of compressed air or gas whose capacity is provided for a cycle of milling the surface of a weld, and this tank 81 may be recharged by a compressor, not shown.

The grinding means 70 also comprise a system 85 for adjusting the position of the abrasive band 71 parallel to the metal wall so as to be able to modify the position of this abrasive band 71 on the surface to be milled and therefore cover the whole surface of the weld to be milled. This system 85 consists, for example, of a screw/nut system or of any other appropriate system of a known type and it may be controlled manually or remotely.

As shown in FIG. 3, the grinding means 70 support, close to the abrasive band 71, a device 90 for recovering, for example by aspiration, the metal particles that may detach from the abrasive band 71 during the milling.

Finally, the movable annular plate 50 supports boxes 95 in which are placed, for example, means for receiving radio signals for the remote control of the means 60 for rotating the movable plate 50 and the grinding means 70. These boxes 94 usually contain all the control and/or regulation elements.

The tracks 36 of the annular electric collector 35 are protected by a casing 96, as shown in FIGS. 3 and 4.

The grinding of the metal wall, that is to say of the outer surface of the bead of weld 16 by means of the grinding machine 20, is carried out as follows.

First of all, the universal support 17 is attached to the nozzle 1a and the two half-rings 30a and 30b of the fixed annular plate 30 are mounted on the universal support 17. These two half-rings 30a and 30b are connected together by the ties 33.

Then, the movable annular plate 50 is mounted on the fixed annular plate 30 by placing the inner chamfered edge 52 of each ring 50a and 50b of the said plate 50 on the grooved rollers 34. These two half-rings 50a and 50b are assembled together by the ties 51 and an operator adjusts the coaxiality of the said fixed annular plate 30 relative to the said movable annular plate 50.

The contacts 56 of the trolley 55 are placed on the tracks 36 of the annular electric collector 35. The operator, by remote control, actuates the electric motor 63 which, by means of the angle transmission box 64 rotates the pinion 62. This pinion 62, meshing with the crown wheel 61 of the movable annular plate 50, rotates the said annular plate 50 which revolves on the grooved rollers 34.

Still by remote control, the operator actuates the electric motor 73 of the grinding means 70 in order to rotate the abrasive band 71 via the drive roller 72. By moving the pressing roller 75 by means of the pneumatic cylinder 79 actuated by the compressed air or gas of the reservoir 81, the abrasive band 71 is placed in contact with the outer surface of the weld 16 with a determined pressure. Under the effect of the rotation of the movable plate 50, this abrasive band 71 revolves about the metal wall and, because of its rotation on the rollers 72, 74 and 75, it mills the outer surface of the weld 16. The power of the electric motor 73 rotating the drive roller 72 of the abrasive band 71 is slaved to the force of pressure of this abrasive band 71 on the outer surface of the weld 16.

The remote control also allows an emergency stop.

The grinding means 70 supported by the movable annular plate 50 may therefore, due to the absence of cables connecting with the environment, make several revolutions in one direction or in the other. The position of the abrasive band 71 parallel to the surface of the weld 16 may be modified by the adjustment system 85 between one or more revolutions.

When the milling of the whole outer surface of the weld has been carried out, the abrasive band 71 is moved away from the metal wall by retracting the pressing roller 75 and the rotation of this abrasive band 71 is stopped by disconnecting the supply from the electric motor 73.

Then, the rotation of the movable annular plate 50 is also stopped by disconnecting the supply from the electric motor 63.

As an example, the width of the abrasive band 71 is approximately 60 mm and the width of the weld 16 on the surface is substantially 60 mm. The power of the electric motor 73 of the grinding means 70 is approximately 3 kW and the thickness of the weld to be ground particularly by milling is 4 mm on average.

The remote control makes it possible in particular to place the abrasive band 71 in contact with the metal wall to be ground, to choose the direction of rotation of the orbital machine and/or to adjust the force of pressure of the abrasive band 71 on the metal wall.

The orbital grinding machine according to the invention therefore makes it possible to carry out a continuous grinding operation without reversal, or changing the direction of rotation, which makes it possible to reduce the total duration of the intervention and the risks of damaging the profile of the surface of the weld and consequently to ensure the reliability of the ultrasound inspection. It also allows a time-saving of 30 to 40% relative to the machines used hitherto and makes it possible to considerably reduce the presence of operators in strongly irradiated zones.

The invention claimed is:

1. Orbital machine for grinding a metal wall of revolution, adaptable to an orbital machine universal support fixed around the metallic wall of revolution, wherein it comprises:
    a fixed annular plate mounted coaxially on the support and comprising at its periphery an annular electric collector,
    an annular plate that can be moved in rotation and is mounted coaxially on the fixed annular plate by means of rolling members, the said movable annular plate supporting:
    a set of electric contacts designed to interact with the electric collector,
    means for the rotational actuation of this movable plate,
    means for grinding the metal wall, and
    pneumatic supply means for pressing and keeping the grinding means on the metal wall.

2. Machine according to claim 1, wherein each annular plate is formed of two half-rings connected together by at least one connecting tie.

3. Machine according to claim 1, wherein the annular electric collector comprises at least four coaxial tracks, at least three tracks each forming one phase and one track for the rotation of the movable plate.

4. Machine according to claim 3, wherein the coaxial tracks are placed on the outer edge of the fixed annular plate.

5. Machine according to claim 1, wherein the set of electric contacts is formed by a trolley comprising two pairs of at least four contacts in order to maintain the electric supply without disconnection in the zones of junction of the tracks of the electric collector between the two half-rings of the fixed annular plate.

6. Machine according to claim 5, wherein the trolley is attached to the outer edge of the movable annular plate.

7. Machine according to claim 1, wherein the means for rotating the movable plate comprise a crown wheel arranged on the said movable plate meshing with at least one pinion rotated by an electric motor by means of an angle transmission, the said at least one pinion, the electric motor and the angle transmission being supported by the fixed annular plate.

8. Machine according to claim 1, wherein the grinding means comprise an abrasive band mounted on three rollers, a drive roller rotated by an electric motor and designed to drive the abrasive band, a roller for tensioning this band and a roller for pressing the said band on the metal wall, the said pressing roller being able to be moved by a control member towards the inside of the said plates.

9. Machine according to claim 8, wherein the power of the electric motor for rotating the drive roller of the abrasive band is slaved to the force of pressure of this abrasive band on the metal wall.

10. Machine according to claim 8, wherein the control member comprises at least one pneumatic cylinder connected to pneumatic supply means.

11. Machine according to claim 1, wherein the pneumatic supply means comprise at least one reservoir of compressed air or gas.

12. Machine according to claim 1, wherein the movable annular plate supports means for receiving radio signals for the remote control of the means for driving the movable plate and the grinding means in rotation.

13. Machine according to claim 1, wherein the grinding means support, near the abrasive band, a device for recovering metal particles.

* * * * *